July 8, 1930.  R. L. BEERS  1,770,061
STOKER CONSTRUCTION
Original Filed Oct. 13, 1924  2 Sheets-Sheet 1
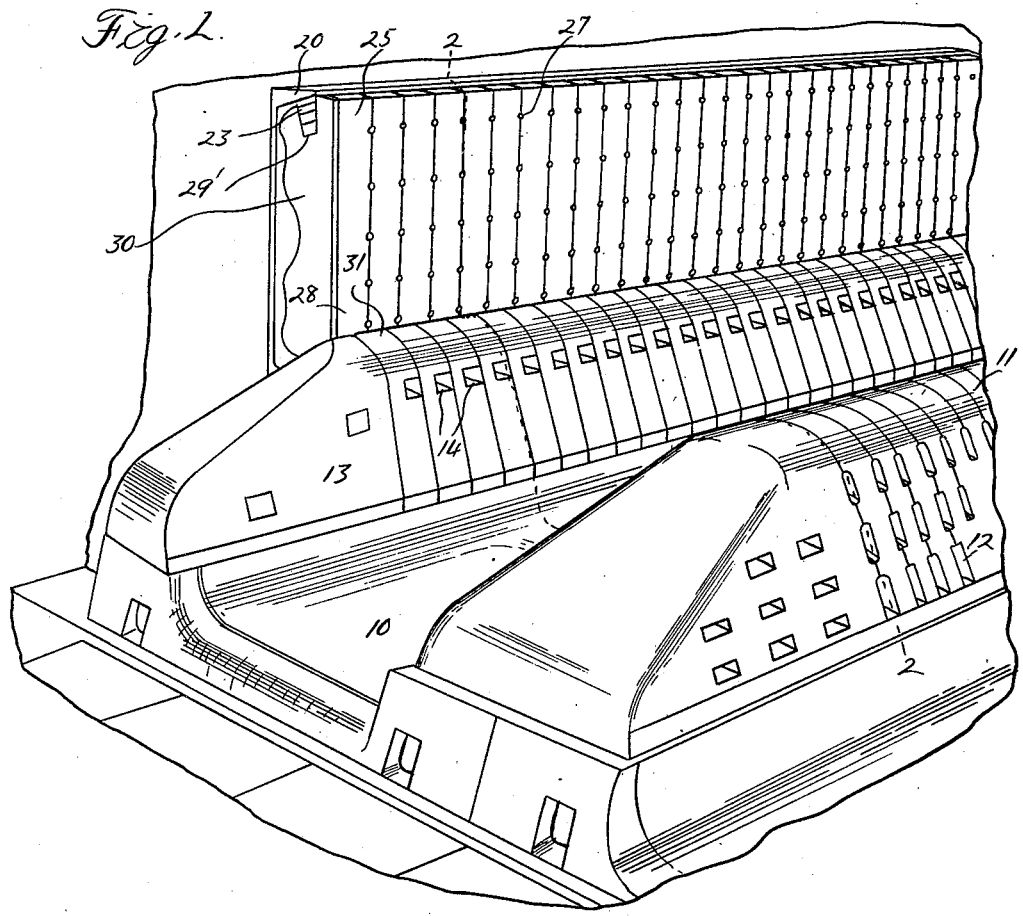
Inventor
Royce L. Beers July 8, 1930. R. L. BEERS 1,770,061
STOKER CONSTRUCTION
Original Filed Oct. 13, 1924  2 Sheets-Sheet 2
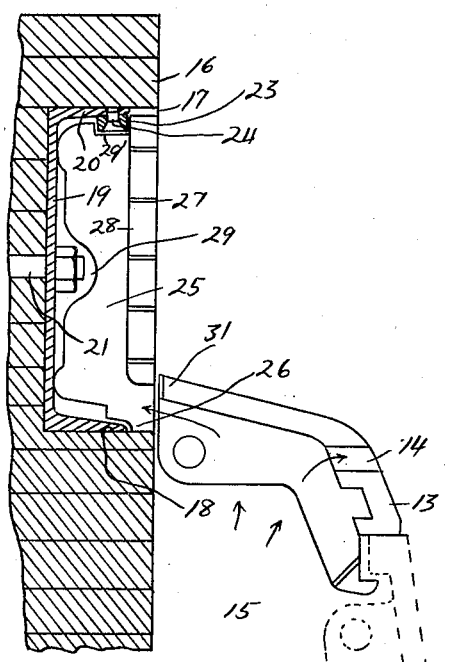
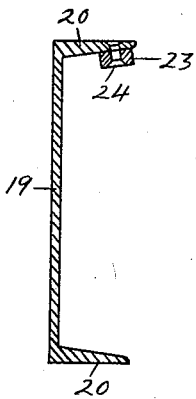
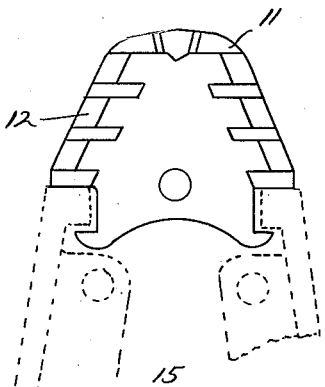
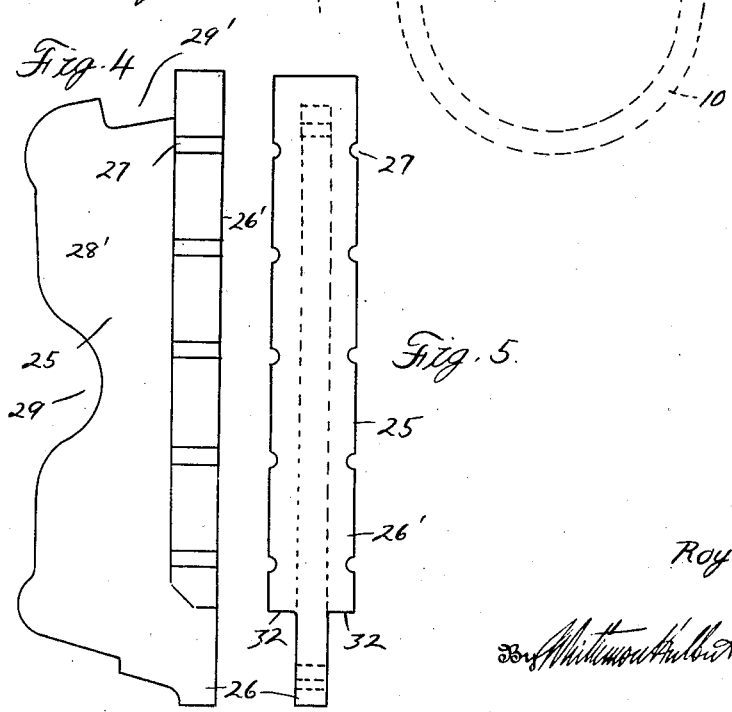
Inventor
Royce L. Beers
Attorneys Patented July 8, 1930

1,770,061

UNITED STATES PATENT OFFICE

ROYCE L. BEERS, OF DETROIT, MICHIGAN, ASSIGNOR TO DETROIT STOKER CO., OF DETROIT, MICHIGAN, A CORPORATION OF MICHIGAN

STOKER CONSTRUCTION

Application filed October 13, 1924, Serial No. 743,476. Renewed April 21, 1930.

The invention relates to improvements in furnaces and more particularly to that type of furnaces known as the underfeed type, in which the fuel is fed longitudinally of the furnace. It is an object of my invention to provide a novel wind box construction for the side walls of a furnace preferably of the aforesaid type. A further object of my invention resides in the means for reinforcing the recessed portions of the side walls forming a housing for the wind box. A further object of the invention resides in the provision of a plurality of removable wind box tuyère blocks and the means of assembling these blocks within the re-inforced recessed side walls of the furnace.

With these and other objects in view, the invention resides in the novel features of construction and combination and arrangement of parts as more fully hereinafter set forth.

In the drawings:

Figure 1 is a fragmentary perspective view of one end of a furnace showing one of the side wall wind boxes.

Figure 2 is a sectional view in elevation on the line 2—2 of Figure 1.

Figure 3 is a vertical section of the U-shaped lining member which is seated in the longitudinally extending recess of the side walls of the furnace structure.

Figure 4 is a view in elevation of one of the wind box tuyère blocks; and,

Figure 5 is a front elevation of the block shown in Figure 4.

In the drawings, reference character 10 represents a plurality of longitudinally extending retorts which are of any desirable number and construction and which form the usual floor for the fuel. 11 indicates the main tuyères forming the division between the retorts 10. The tuyères 11 are provided with the usual tuyère openings 12 for supplying air under pressure to the fuel and the combustion chamber. The outside retorts which extend longitudinally adjacent the side walls of the furnace structure are formed with longitudinally extending side tuyères 13, one of which is shown in Figure 1. The side tuyères are likewise provided with suitable tuyère openings 14, which supply air to the fuel and combustion chamber. The air is supplied under pressure from the usual wind chest 15, located below the tuyères 12 and 13 and retorts 10.

Side walls 16, one of which is shown in Figure 2, define the longitudinal sides of the combustion chamber and are preferably constructed of masonry, fire-brick or the like. Each wall is formed with a recess 17 preferably extending the length of the furnace. The floor 18 of the recess preferably lies below the upper extremity 31 of the adjacent side tuyère 13.

A lining reinforcing member 19 is provided and is preferably a metal casting and as shown, is U-shaped. The lining is provided with horizontal leg portions 20 for reinforcing engagement with the upper and lower walls respectively of the recess 17 and also for co-operation of the tuyère blocks 25 as hereinafter set forth. The lining 19 preferably extends the length of the recess 17 and is adapted to be fitted therein as shown. Suitable means may be provided spaced at intervals of the length of the lining for securely anchoring the lining to the wall 16, such as by an anchoring bolt 21 and a nut 22.

To the under-face of the forward extremity of the upper leg portion 20 of the lining 19, is secured by suitable means such as rivets 24, a retaining or positioning bar 23 running the length of the lining. The purpose of this retaining bar will be presently explained.

The wind box tuyère blocks 25 are formed with a base portion 26 adapted to engage the floor of the recess 17 between the extremity of the lower leg 20 of the lining and the edge of the recess. The blocks 25 are formed with a face 26' the edges of which, have spaced segmental openings 27 preferably semi-circular in form. Adjacent blocks when assembled within the recess in longitudinal alignment are adapted to have their openings 27 in registry so as to provide circular openings between the adjacent edges of the blocks. When so assembled, the faces of the blocks will preferably lie in the plane of the wall 16, as shown in Figure 2. The openings 27 are adapted to conduct air from the recess forming the wind box housing into the combustion chamber as hereinafter explained.

The blocks 25 are constructed with ribs 28 extending rearwardly from the faces 25 as shown in Figure 4. These ribs do not entirely fill the space at the rear of the face of the blocks, but are preferably shaped as shown so as to permit air from the wind chest 15 to circulate in back of the blocks. The ribs are preferably cut at 29 to provide for the projecting bolts 21. The upper forward ends of the blocks are provided with cut out portions 29 located at the rear of the top face portions of the block. These cut out portions are adapted to receive the retaining bar 23 in assembling the blocks within the side wall wind box, the upper ends of the blocks being tilted inwardly, as will be readily understood, to permit the engagement. The lower ends of the blocks are then swung inwardly to be removably secured to the blocks in proper position. Each block is thus assembled in proper alignment until the wind box is filled, or such part thereof as desired.

In order to fill up any space at the ends or intermediate the extremity of the wind box, or to temporary or permanently replace one or more blocks, I provide filler blocks 30, preferably shaped to correspond to the general outline of the blocks.

The side tuyères 13 are formed with projecting portions 31 arranged to abut the blocks as shown in Figure 2 and deflect the air from the wind chest 15 inwardly to the side wall wind boxes, where it is distributed through the openings 27.

It will be observed that the cast metal member 19 reinforces the recess 17, forming each of the side wall wind boxes and also serves as a lining forming the rear and top walls of the wind box.

The front face 26′ of the blocks is preferably cut away at 32 below the inwardly extending portion 31 of the side tuyères, leaving the ribs 28 extending downwardly therebelow. This construction will permit ready circulation of the air from the wind box 15 into the side wall wind boxes.

It is apparent from the foregoing, that I have provided a side wall wind box of simple construction. The wind box tuyère blocks are readily assembled in place and securely held in position. It will further be noted that each wind box tuyère block is removable with respect to the U-shaped lining 19 and also with respect to each of the blocks.

I do not limit myself to a wind box construction in connection with any particular type of furnace as such construction is equally well adapted wherever found desirable in connection with various types of furnaces.

What I claim as my invention is:—

1. In combination with a furnace structure and recessed wall thereof, said furnace having a wind chest for supplying air to the fuel, a U-shaped lining within the recess, a positioning bar attached to one of the legs of the U-shaped lining, a plurality of tuyère blocks recessed for engagement with the positioning bar and normally secured to the lining but detachable therefrom, means within the recess for supporting the said blocks, and a communication for supplying air from the furnace wind chest to said tuyère blocks.

2. The combination in a furnace structure embodying a wind chamber, main tuyères and side tuyères of a wall adjacent the side tuyères, said wall having a longitudinally extending recess, the lower extremity of which extends below the top of the side tuyères adjacent thereto, a U-shaped lining at the rear of the recess provided with horizontally extending legs terminating short of the edges of the recess, means for securing the lining to the wall, a retaining member secured to one leg of the U-shaped lining, a plurality of wind box tuyère blocks removably secured within the recess, each block being formed with a rearwardly extending flange and having a front face portion at right angles to the flange, said flange being recessed adjacent the face portion for engagement with the said retaining member, said face portion of each block adapted to lie in the plane of the wall and having at its opposite edge portions semi-circular channels adapted to register with like channels of the adjacent block to form air conducting passages, and means for conducting air from the wind chamber to the wind box.

3. In a furnace structure, a wind chest, a side wall provided with a recess, a side tuyère arranged with its adjacent edge above the floor of said recess, elongated tuyère blocks vertically disposed within said recess with the lower ends thereof below and overlapping the said edge of said tuyère and a communication through said overlapping tuyère portions for supplying air from said wind chest to said elongated tuyère.

4. In a furnace structure, a side wall provided with a recess, a side tuyère having its upper adjacent side edge spaced above the floor of said recess, a positioning bar secured within said recess adjacent the top thereof, and a plurality of removable tuyère blocks recessed for engagement with said positioning bar and resting within said recess with the lower ends thereof behind said side tuyère.

5. In a furnace structure, a wind chest, a side wall provided with a recess, a side tuyère arranged with its adjacent edge above the floor of said recess, a tuyère arranged within said recess with the lower end thereof below and overlapping the said edge of said side tuyère, and a communication through said overlapping tuyère portions for supplying air from said wind chest to the tuyère in said side wall recess.

6. In a furnace structure, a wind chest, a side wall provided with a recess, a tuyère in said recess, a side tuyère having the edge adjacent said wall arranged above the floor of said recess and overlapping the lower end of the tuyère located therein, said side tuyère acting to direct air from said wind chest to said recess through the communication provided by the overlapping portions of said side tuyère and recess.

7. In a furnace structure, a wall provided with a recess, a tuyère in said recess, a retort spaced from said wall, a wind chest below said retort, and a tuyère arranged between said retort and recess, said recess extending below the upper end of said last named tuyère and in direct communication with said wind chest immediately adjacent said tuyère end whereby said last named tuyère directs air from said wind chest to and into said recess.

8. In a furnace structure, a retort, a wind chest below said retort, a wall provided with a recess, a tuyère in said recess, and a second tuyère engaging said retort and arranged between said retort and recess and above said wind chest, said recess extending below the adjacent end of said second tuyère and in direct communication with said wind chest immediately adjacent said tuyère end whereby said last named tuyère directs air from said wind chest into said recess.

In testimony whereof I affix my signature.

R. L. BEERS.